March 17, 1970  L. M. NIJLAND ET AL  3,500,732
APPARATUS FOR SEQUENTIALLY IGNITING FLASH LAMPS
Filed June 8, 1967  2 Sheets-Sheet 1

INVENTORS
LOUIS MARIUS NIJLAND
JOHANN SCHRODER
BY EKKEHARD ANDRICH

AGENT

March 17, 1970  L. M. NIJLAND ET AL  3,500,732
APPARATUS FOR SEQUENTIALLY IGNITING FLASH LAMPS
Filed June 8, 1967  2 Sheets-Sheet 2

INVENTORS
LOUIS MARIUS NIJLAND
JOHANN SCHRODER
BY EKKEHARD ANDRICH

AGENT

United States Patent Office 3,500,732
Patented Mar. 17, 1970

3,500,732
APPARATUS FOR SEQUENTIALLY IGNITING FLASH LAMPS
Louis Marius Nijland, Emmasingel, Eindhoven, Netherlands; Johann Schroder, 125A, 51 Aachen, Drimbornallee, Germany; and Ekkehard Andrich, Eupenerstrasse 18, Aachen, Germany
Filed June 8, 1967, Ser. No. 644,506
Claims priority, application Netherlands, June 24, 1966, 6608781; Sept. 30, 1966, 6613816
Int. Cl. G03b 9/70, 15/02
U.S. Cl. 95—11.5         1 Claim

ABSTRACT OF THE DISCLOSURE

An apparatus for sequentially igniting a plurality of flashlamps connected in parallel by providing a voltage surge across the lamps causing ignition of only the lamp having the lowest voltage breakdown characteristics. The apparatus includes a flashlamp holder, a voltage source, a capacitor, a pair of switching elements, and a pulse transformer. One of the switching elements is closed in response to attachment of the flashlamp holder to a camera to connect the voltage source across the capacitor to charge it up to a given potential. The other switching element is closed during operation of the shutter mechanism of the camera to cause discharge of the capacitor across the pulse transformer which will produce a voltage surge across the parallel connected flashlamps. When the flashlamp having the lowest voltage breakdown characteristics is ignited, the voltage surge across the flashlamps decreases thereby enabling the flashlamps to be ignited sequentially.

---

The invention relates to a device for exposing parts of a photographic film or another photosensitive material with the use of actinic light produced by combustion flashlight lamps, which device comprises a camera provided with a flash contact, a voltage source and a holder with a number of combustion flashlight lamps, whilst the parts of the device can be electrically interconnected.

Devices of the said kind are known by means of which a number of photographs equal to the number of flashlight lamps in the holder can be taken with the use of actinic light, without the necessity of exchanging the flashlight lamps in the meantime. These devices generally include a series switch which is coupled either with the film-transport mechanism or with the flash contact.

Moreover, devices have been suggested which include a number of switching elements which close a current bridge under the influence of energy emitted by an ignited flashlight lamp.

Such devices are complicated and vulnerable and in certain cases, even a camera is required which is specially designed for use in such a device.

The invention has for an object to provide a simple solution for the sequential ignition of combustion flashlight lamps while using cameras which are not specially designed for the purpose, the use of complicated and vulnerable switching elements being avoided.

A device in accordance with the invention comprises besides a camera provided with a flash contact, a high-voltage source and combustion flashlight lamps which, when ignited, exhibit a current-voltage characteristic having a part of negative inclination and which are arranged in a holder so that they are electrically connected in parallel.

In a device according to the invention, first the flashlight lamp is ignited which requires the lowest voltage. Subsequently, the flashlight lamp is ignited which requires the next higher voltage. When a flashlight lamp is ignited, the voltage across it generally decreases rapidly. The risk of two or more flashlight lamps being ignited simultaneously when the flash contact of the camera is closed is therefore small and may be reduced to a minimum by comparatively simple steps.

Combustion flashlight lamps in which the ignition is effected or is initiated by flash-over between two electrodes, may be used in the device according to the invention. These flashlight lamps are known per se.

Breakdown in a gas or a gas mixture occurs only after the gas between said electrodes has slightly ionized due to some cause or other, for example, to cosmic radiation, and the voltage difference between the electrodes has increased to a value at which the gas between the electrodes has continued to ionize to a sufficient extent. During flash-over, the voltage between the electrodes decreases comparatively rapidly.

It is not possible in practice for the distance between the electrodes and the remaining parameters in the flashlight lamps determining the voltage at which flash-over will occur between the electrodes, to be proportioned in the manufacture in such a reproducible manner that all the flashlight lamps of this construction are ignited at accurately the same voltage across the electrodes. However, this is the very reason for which flashlight lamps in which ignition is effected by flash-over are particularly suitable to be used in a holder in which they are connected in parallel. In such a holder, first the flashlight lamp is ignited in which flash-over occurs at the lowest voltage. The voltage across the electrodes of the flashlight lamps in the holder then decreases comparatively rapidly. The next time a flashlight lamp in the holder has to be ignited, that flashlight lamp is ignited in which flash-over occurs at the next higher voltage, and so on. Flashlight lamps which fail for some reason or other do not prevent the ignition of the other lamps in the holder.

The flashlight lamps that can be used in the holder according to the invention may be, for example, of the type in which (a) Flash-over results in explosive combustion of the mass disposed on or between the electrodes: the reaction between a metal wool and a gas in the lamp is initiated by the glowing particles flung away.

(b) Flash-over results in the combustion of a volatile compound in a gaseous mixture: thus a metal wool is ignited.

(c) Flash-over causes a reaction in a mixture of relatively reactive gases: the energy then released is emitted in part as visible light.

Since after the ignition of these flashlight lamps, these electrodes are generally coated with an oxide layer and are frequently partially molten, the possibility of flash-over occurring again in a flashlight lamp which has been previously ignited is small.

Another type of flashlight lamp that can be used in devices according to the invention is designed particularly for this purpose and includes an ignition mechanism in which the ends of the current-supply wires are electrically interconnected by means of an ignition mass containing an oxidizable material and an oxidizer, which materials are caused to react exothermally by electric breakdown through the mass and subsequent current passage.

The voltage required for ignition may be obtained, for example, by means of a generator, a dynamo, a piezoelectric crystal or in another appropriate manner. In this case, it is advantageous for the high-voltage source to be incorporated in the camera. This source may be constituted, for example, by a dynamo which is mechanically coupled with a spring mechanism. This spring mechanism is coupled with the film-transport handle. When this handle is pulled over, the spring is stretched. When the shutter is opened in order to take a photograph, a lock is released and the relieving spring drives the dynamo.

A few embodiments of the invention will now be described more fully with reference to the accompanying drawings.

FLASHLIGHT LAMP (FIGS. 1, 2, 3, 4)

Figures 1, 2:
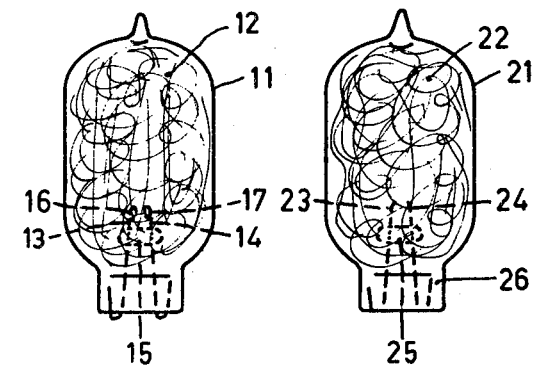
FIGS. 1, 2, 3 and 4 are sectional views of flashlight lamps that can be used in holders according to the invention.

FIGS. 1 to 4 show a number of flashlight lamps of different types that can be used in a device according to the invention. The lamp of FIG. 1 comprises a transparent bulb 11 in which a metal wool 12, for example of zirconium, is disposed. The lamp is filled with a gas which, after ignition, reacts exothermally with the metal wool whilst emitting actinic light. This gas may be, for example, oxygen or a volatile fluoro-compound such as $NF_3$. The lamp further comprises an ignition mechanism consisting of two electrodes 13 and 14 the relative positions of which are fixed by a glass bead 15. The ends of the electrodes are coated with an explosive mass 16 and 17, respectively. Upon flash-over between the electrodes 13 and 14, the masses 16 and 17 explode and in turn initiate the reaction between the metal wool 12 and the gas filling. The masses (16 and 17) may consist, for example, of a mixture of powdered metal, for example zirconium, an oxidizer, for example potassium perchlorate, and a binder such as nitrocellulose. The lamp of FIG. 2 comprises a transparent bulb 21 in which a metal wool 22, for example, of zirconium is disposed. The lamp is filled with a mixture of oxygen or a fluorocompound and a small quantity of a hydrocarbon. The ignition mechanism consists of two electrodes 23 and 24 the relative positions of which are fixed by a glass bead 25. Flash-over between the electrodes 23 and 24 results in an explosive combustion of the hydrocarbon, which in turn gives rise to the ignition of the metal wool 22. The gas filling may consist, for example, of oxygen containing at least 5.4% by volume of $CH_4$ or 2.1% by volume of $C_3H_6$.

Figures 3, 4:
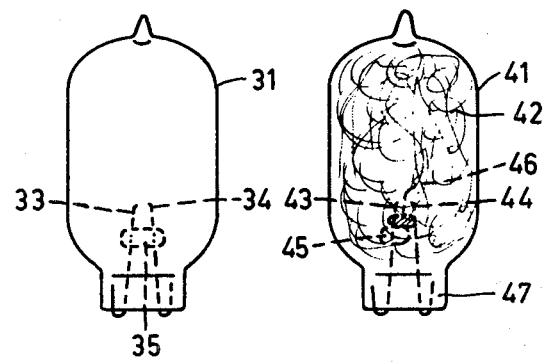

The lamp of FIG. 3 comprises a transparent bulb 31. The lamp is filled with a combustible gas mixture, for example $CS_2$ and a nitrogen oxide in stoichiometric quantities. The ignition mechanism consists of two electrodes 33 and 34 the relative positions of which are fixed by a glass bead 35. The flash-over results in a reaction between the constituents of the gas mixture whilst actinic light is emitted.

The flashlight lamp of FIG. 4 comprises a transparent bulb 41. The lamp includes a metal wool 42, for example of zirconium. It is filled with oxygen or another gas reacting with the metal wool. The ignition mechanism consists of two current-supply wires 43 and 44 only the current-supply wire 43 supporting a bead 45. Thus, it is achieved that combustion products do not establish current bridges between the ends of the current-supply wires 43 and 44. The ends of the current-supply wires are interconnected by means of an ignition mass 46 consisting of a mixture of an oxidizer, an oxidizable material and a binder. The mass may further contain an electrically conducting material and an activator. A suitable ignition mass contains, for example, 34.2% by weight of zirconium powder, 25.4% by weight of potassium perchlorate, 3.9% by weight of red phosphorus, 25.8% by weight of semiconducting lauthane cobaltite ($La_{0.8}Sn_{0.2}CoO_3$) and 1.7% by weight of nitrocellulose as a binder.

Before and after the ignition, this type of flashlight lamp has a resistance (measured at 22 v.) of the order of 10 $\mu\Omega$.

HOLDER (FIG. 5)

Figure 5:
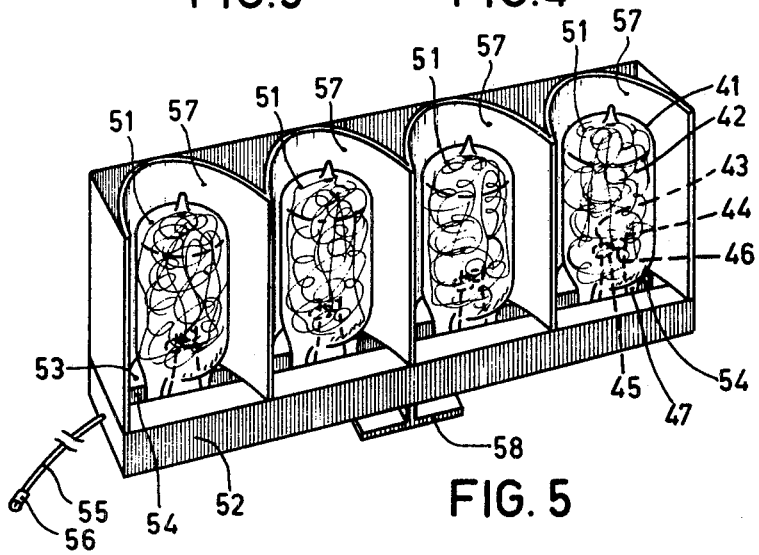
FIG. 5 is a perspective view of an embodiment of a holder according to the invention.

FIG. 5 shows a possible embodiment of a holder according to the invention in which are provided four flashlight lamps 51 of the type of FIG. 4. The holder consists of a box which is partly open on the front side and entirely open on the upper side and which is made of a cheap but comparatively strong material such as cardboard. On the base are provided two beams 52 and 53 which are folded from cardboard; between these beams is left a channel-shaped space 54 the side walls of which are covered with a conducting strip, for example, a thin copper foil, applied by sticking. The flashlight lamps 51 are placed in the channel by their pinches 47; the current-supply conductors then establish an electrical contact with one of the conducting strips. The conducting strips are connected to a bipolar cable 55 provided with a plug 56 for establishing the connection with the voltage source. Behind the flashlight lamps are disposed reflectors 57 consisting, for example, of cardboard coated on the side facing the flashlight lamp with a reflective layer of, for example, aluminum. The holder may be secured on a camera or a voltage source by means of the slip-on cap 58. The flashlight lamps in this holder are ignited in a quite arbitrary order of succession.

VOLTAGE SOURCE (FIG. 6)

Figure 6:
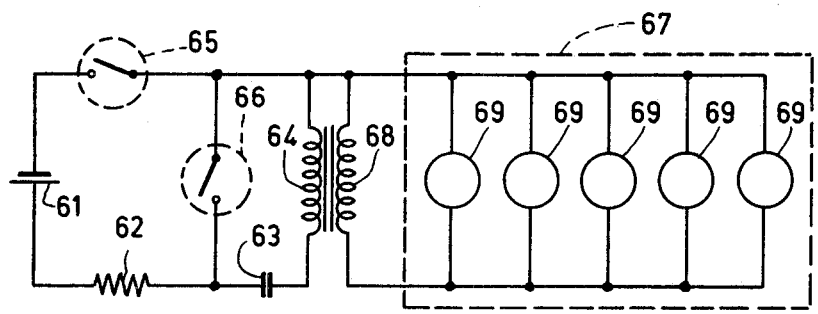
FIG. 6 shows a circuit diagram of a high-voltage source and parallel-connected flashlight lamps.
Figure 7:
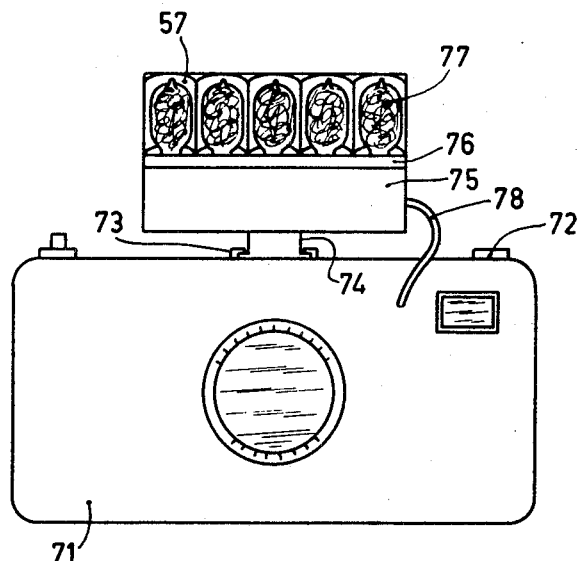
FIG. 7 is a front elevation of an embodiment of a device according to the invention.

FIG. 6 shows a circuit diagram.

According to this circuit diagram, the high-voltage source comprises a battery 61, one terminal of which is connected through the series-combination of a resistor 62 and a capacitor 63 to a terminal of the low-voltage winding 64 of a pulse transformer. The other terminal of battery 61 is connected to the other terminal of the low-voltage winding 64 of the pulse transformer. The circuit includes two switching elements. The switching element 65 is closed mechanically at the instant at which the holder with the flashlight lamps is connected to the high-voltage source. It is thus prevented that the battery decays when it is out of use. A switching element 66 is coupled with the shutter of the camera and it is closed when the shutter is opened. In the holder (indicated by a broken line 67) are disposed five parallel-connected flashlight lamps 69. The lamps are connected to the high-voltage winding 68 of the pulse transformer, as indicated in the circuit diagram.

In a practical embodiment, use is made of a battery 61 of 6 v., a resistor 62 of 850Ω, a capacitor 63 of 100 µf. and a pulse transformer (64/48) the low-voltage winding 64 of which consists of 8 turns and the high-voltage winding 68 of which consists of 8000 turns provided on a soft magnetic core. Such a voltage source supplies a voltage of about 3000 v. which approximately has the shape of a damped sinusoidal oscillation having an oscillation time of the order of $10^2/\mu sec$. The energy supplied is approximately 100 microjoules.

If the switching element 66 is closed for a short time whilst the switching element 65 is closed, one of the flashlight lamps 69 will be ignited. The next time the switching element 66 is closed, a subsequent lamp is ignited.

DEVICE (FIG. 7)

The device shown in this figure for exposing a photographic film whilst using actinic light in accordance with the invention comprises an arbitrary camera 71 provided with a flash contact 72 and a clamp 73 into which the slip-on cap 74 of the high-voltage source can be inserted. The high-voltage source 75 is accommodated in a rectangular box made, for example, of synthetic resin and having the dimensions 5 x 2.5 x 2.5 cm. The upper side of the box is provided with a slot for receiving the holder 76 with flashlight lamps 77. An electrical contact between the high-voltage source 75 and the holder 76 may be established, for example, by providing contacts in the slot which get into touch with contacts in the base of the holder 76 when the holder is inserted. The high-voltage source 75 is connected through a cable 78 to the flash contact of the camera.

A device according to the invention may comprise any camera provided with a flash contact. The device does not include complicated and vulnerable switching elements. The holder may be of a cheap and simple construction and be designed to be used only once.

What is claimed is:
1. A photographic exposure device comprising a plurality of flashlamps, each having a different breakdown voltage and a negative current-voltage breakdown characteristic during ignition, means connecting said lamps in parallel, and means for selectively successively igniting each of said lamps, said igniting means comprising a voltage source, a capacitor, means for connecting the voltage source across the capacitor to charge up the same to a given potential, and means to discharge said capacitor and produce a discharge current, means for coupling said capacitor during discharge to said lamps and for converting said capacitor discharge current to a voltage having a rising characteristic until at least the lowest breakdown voltage of one of the lamps is reached and thereafter in response to ignition of said one lamp, said voltage characteristic decreases whereby only said one lamp is ignited.

References Cited

UNITED STATES PATENTS

| | | | |
|---|---|---|---|
| 2,756,577 | 7/1956 | Anderson | 431—95 |
| 2,737,797 | 3/1956 | Caldwell | 95—11.5 XR |
| 3,232,194 | 2/1966 | Ostrow | 240—1.3 XR |
| 3,237,003 | 2/1966 | Tomkinson | 240—1.3 |

FOREIGN PATENTS 1,294,025  4/1962  France.

JOHN M. HORAN, Primary Examiner

FRED L. BRAUN, Assistant Examiner

U.S. Cl. X.R.

240—1.3; 431—95